Figure 1:
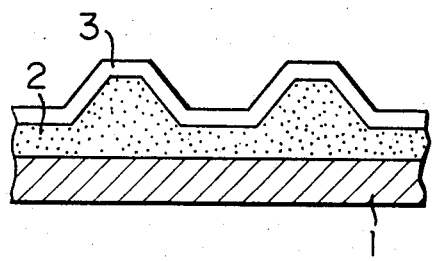

United States Patent [19]

Honda et al.

[11] 4,278,728

[45] Jul. 14, 1981

[54] EMBOSSED INTERIOR FINISHING MATERIALS HAVING EXCELLENT CIGARETTE MARK RESISTANCE

[75] Inventors: Kiyoshi Honda, Hirakata; Kazuya Kuriyama, Chiba; Shigeru Murakami, Ichihara; Ryozo Sugawara; Chiaki Nakamura, both of Chiba, all of Japan

[73] Assignee: Dainippon Ink & Chemicals, Inc., Tokyo, Japan

[21] Appl. No.: 88,416

[22] Filed: Oct. 26, 1979

[30] Foreign Application Priority Data

Oct. 30, 1978 [JP] Japan ................. 53-132613

[51] Int. Cl.³ .................. B32B 3/00; B32B 5/18; B32B 5/20; B05D 3/06
[52] U.S. Cl. .................. 428/313; 156/79; 156/272; 427/54.1; 427/373; 428/159; 428/246; 428/284; 428/286; 428/314; 428/315; 428/520
[58] Field of Search ............... 428/159, 158, 246, 284, 428/286, 313, 314, 315, 520; 427/54.1, 373, 407.1, 412.4; 156/79, 272

[56] References Cited

U.S. PATENT DOCUMENTS

| | | | |
|---|---|---|---|
| 2,945,795 | 7/1960 | Cummin | 427/44 |
| 3,365,353 | 1/1968 | Witman | 428/159 |
| 3,399,106 | 8/1968 | Palmer et al. | 428/159 |
| 3,433,700 | 3/1969 | Migdol et al. | 428/159 |
| 3,453,171 | 7/1969 | Crowley | 428/159 |
| 3,931,429 | 1/1976 | Austin | 428/159 |
| 4,022,943 | 5/1977 | Erb et al. | 428/315 |
| 4,100,318 | 7/1978 | McCann et al. | 428/159 |
| 4,138,521 | 2/1979 | Brown | 428/159 |
| 4,210,693 | 7/1980 | Regan et al. | 428/315 |
| 4,214,028 | 7/1980 | Shortway et al. | 428/315 |

FOREIGN PATENT DOCUMENTS 2855460  6/1979  Fed. Rep. of Germany ........... 428/159

Primary Examiner—William J. Van Balen
Attorney, Agent, or Firm—Sherman & Shalloway

[57] ABSTRACT

An embossed interior finishing material having superior cigarette mark resistance, said material comprising
(A) a base material
(B) formed on said base material, a foamed and ultraviolet-cured undercoat layer obtained from a vinyl chloride polymer, a reactive plasticizer, a blowing agent and a light sensitizer, and
(C) formed on said undercoat layer, an ultraviolet-cured top coat layer obtained from a vinyl chloride polymer, a reactive plasticizer and a light sensitizer, or
(C') formed on said undercoat layer, an ultraviolet-cured top paint layer.

13 Claims, 8 Drawing Figures

EMBOSSED INTERIOR FINISHING MATERIALS HAVING EXCELLENT CIGARETTE MARK RESISTANCE

This invention relates to an embossed interior finishing material having excellent cigarette mark resistance (which means that when a lit cigarette is placed on the surface of the interior finishing material and crushed out by a shoe sole, the degree of breakage of the surface or the degree of ash adhesion to the surface is low).

In recent years, interior finishing materials such as floor or wall materials having embossed patterns have been required to have good fashionability, and therefore have been produced in various colors and designs. These conventional floor or wall materials are covered with a sol composed of a thermoplastic resin, particularly polyvinyl chloride (PVC for short). Accordingly, they have weak resistance to fire, for example to a cigarette fire. Thus, if a lit cigarette is thrown away onto the floor material and left as it is or is crushed out with a shoe sole, the surface of the material will be melted or depressed. Even when no depression is formed, the cigarette ash may adhere to the surface to make it blackish. Consequently, the aesthetic appearance of the material is reduced.

In an attempt to remove this defect, a method was already suggested in which a composition comprising PVC, a reactive plasticizer and a light sensitizer is coated on the surface of a foamed article, and the reactive plasticizer is cured by the irradiation of ultraviolet light to improve the surface hardness (Japanese Laid-Open Patent Publication No. 98786/76). Since, however, the above composition is to be coated in the form of PVC sol in this method, a non-reactive plasticizer is frequently used in combination. Thus, the surface layer of the product frequently contains the unreacted plasticizer, and its cigarette mark resistance is not entirely sufficient.

According to this invention, there is provided an interior finishing material free from the defect of the conventional products, said material comprising (A) a base material, (B) formed on said base material, a foamed and ultraviolet-cured undercoat layer obtained from a vinyl chloride polymer, a reactive plasticizer, a blowing agent and a light sensitizer, and (C) formed on said undercoat layer, an ultraviolet-cured top coat layer obtained from a vinyl chloride polymer, a reactive plasticizer, and a light sensitizer or (C') formed on said undercoat layer, an ultraviolet-cured top paint layer.

The vinyl chloride polymer (or sometimes, referred to simply as PVC) used in the undrcoat layer (B) and the top coat layer (C) has an average degree of polymerization of 500 to 4,000, and embraces a homopolymer of vinyl chloride, copolymers of a major proportion of vinyl chloride and a minor proportion of a copolymerizable monomer such as vinyl acetate, acrylonitrile, styrene, acrylic acid esters, methacrylic acid esters, ethylene, propylene and butylene, and mixtures of these.

The vinyl chloride polymer may also be used in combination with another polymer. The other polymer may be any of those which are compatible with the vinyl chloride polymer, but elastomers which will give flexibility to the composition are preferred. Specific examples of such elastomers are natural rubber, nitrile rubber, styrene-butadiene rubber, acrylonitrile-butadiene rubber, chloroprene rubber, acrylic rubber, chlorinated polyethylene, ethylene-vinyl acetate copolymer, and ethylene-vinyl acetate vinyl chloride graft copolymer. When such an elastomer is to be incorporated in the vinyl chloride polymer, its amount is generally 1 to 30 parts, preferably 3 to 10 parts by weight, per 100 parts by weight of the vinyl chloride polymer.

The reactive plasticizer used in the undercoat layer (B) and the top coat layer (C) should have at least two polymerizable unsaturated bonds, and should be able to plasticize the vinyl chloride polymer before curing. The reactive plasticizer has previously been incorporated in PVC, and known. Suitable reactive plasticizers have a molecular weight of 200 to 10,000, preferably 300 to 4,000. Molecular weights of 300 to 1,000 are most preferred because plasticizers with these molecular weights have high compatibility with PVC and allow a cross-linking reaction to take place more smoothly during radiation of ultraviolet light.

Specific examples of the reactive plasticizers include polyfunctional acrylic monomers obtained from acrylic or methacrylic acid and an aliphatic polyhydric alcohol such as ethylene glycol, butylene glycol, 1,6-hexanediol, propylene glycol, neopentyl glycol, polyethylene glycol, polypropylene glycol, trimethylolpropane, trimethylolethane and glycerol; allyl esters of aliphatic unsaturated acids such as diallyl maleate and diallyl itaconate; epoxy acrylates obtained from polyepoxy compounds such as bisphenol-type epoxy resin and epoxidized soybean oil and unsaturated acids such as acrylic acid and methacrylic acid; unsaturated polyesters; polyester acrylates (e.g., bismethacryloyloxy ethylene phthalate) obtained from dibasic acids such as phthalic anhydride, adipic acid and terephthalic acid, glycols such as ethylene glycol, propylene glycol and butylene glycol, and unsaturated monobasic acids such as acrylic acid and methacrylic acid; and urethane acrylates obtained from diisocyanates such as tolylene diisocyanate, hexamethylene diisocyanate and diphenylmethane diisocyanate and esters of acrylic acid or methacrylic acid having 1 hydroxyl group in the molecule such as 2-hydroxyethyl acrylate and 2-hydroxypropyl methacrylate. Polyfunctional acrylic oligomers obtained from an alkylene oxide adduct of bisphenol A or bisphenol F and acrylic acid or methacrylic acid, such as those of the following formula

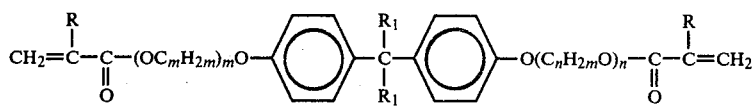

wherein R and $R_1$ each represent a hydrogen atom or a methyl group, m represents an integer of 2 to 4, and n represents an integer of 1 to 10, can also be used as the reactive plasticizer.

Especially preferred reactive plasticizers are those which are derived from methacrylic acid and containing at least one aromatic ring in the molecule.

The blowing agent used in this invention is an organic compound which usually has a decomposition initiating temperature of 150° to 280° C., preferably 180° to 250° C. Specific examples include azo compounds such as diazoaminobenzene, 1,3-diphenyltriazene, azodicarbonamide, 1,1'-azobisformamide, 2,2'-azoisobutyronitrile and azohexahydrobenzonitrile; hydrazide compounds such as benzenesulfonyl hydrazide and p,p'-hydroxybis-benezenesulfonyl hydrazide; azide compounds such as p-tertiary butyl perbenzoate, and nitroso compounds such as N,N'-dinitrosopentamethylenetetramine compounds. Azodicarbonamide is especially preferred.

The light sensitizer used in this invention is excited by irradiation of ultraviolet light to induce a cross-linking reaction of the reactive plasticizer. Examples of the light sensitizer include benzoin, $\alpha$-methylbenzoin, $\alpha$-allylbenzoin, benzoin methyl ether, benzoin isopropyl ether, benzoin sec-butyl ether, acetophenone, benzophenone, p-bromobenzophenone, 4,4'-tetramethyldiaminobenzophenone, diphenyl disulfide, tetraethyl thiuram disulfide, decyl allyl sulfide, decyl thiobenzoate, benzil, diacetyl, uranyl nitrate, eosine and thionine. Of these light sensitizers, benzoin compounds are preferred, above all, $\alpha$-methylbenzoin is preferred. These light sensitizers are more effective when used in combination with aromatic nitro compounds such as trinitroaniline, nitronaphthalene, 5-nitroacenaphthene, 2-nitrofluorene and picramide; quinones such as naphthoquinone, anthraquinone and 2,3-diphenylanthraquinone; anthrones; or pyrylium salts.

The base material (A) of the interior finishing material of this invention includes, for example, an asbestos sheet, a glass fiber-incorporated PVC sheet, a flax felt, a cotton cloth, a nonwoven cloth, a PVC sheet, a PVC foamed sheet, a paper sheet, a polywood, a particle board, a slate plate, an aluminum plate, and a steel plate. It is selected according to the desired end use.

The amount of the reactive plasticizer used in the top layer (C) and the undercoat layer (B) in the present invention is properly selected so that the result intended by this invention can be achieved. Specifically, in the undercoat layer (B), the reactive plasticizer is frequently used in combination with a non-reactive plasticizer such as dioctyl phthalate because of the need to foam the layer (B). The amount of the reactive plasticizer in the undercoat layer (B) is generally 3 to 70 parts by weight, preferably 10 to 50 parts by weight, per 100 parts by weight of the vinyl chloride polymer. If the amount is less than 3 parts, the curing activity is not enough, and if it exceeds 70 parts, the resulting foam tends to be rigid. In the top coat layer (C), on the other hand, the amount of the reactive plasticizer is 3 to 70 parts by weight, preferably 20 to 60 parts by weight, per 100 parts by weight of the vinyl chloride polymer because the main purpose of the top coat layer (C) is to increase heat resistance and mechanical strength. Preferably, the top coat layer (C) has such flexbility that does not cause collapsing of the foamed portion of the under coat layer (B). To impart such flexibility, it is desirable to add 3 to 70 parts by weight, preferably 20 to 60 parts by weight, per 100 parts by weight of the vinyl chloride polymer of non-reactive plasticizer to the top coat layer. Suitable non-reactive plasticizers are those which are normally liquid, such as dioctyl phthalate, dibutyl phthalate, dibutyl-lauryl phthalate, and diheptyl phthalate.

The amount of the light sensitizer used in the undercoat layer (B) and the top coat layer (C) is usually 0.001 to 10% by weight based on the reactive plasticizer. Needless to say, amounts outside this range may be used if they result in the achievement of the effects intended by the present invention.

The amount of the blowing agent used in the undercoat layer (B) can be properly varied according to the desired degree of the embossed pattern on the foamed article.

In an alternative embodiment of this invention, a top paint layer (C') cured by irradiation of ultraviolet light may be used instead of the top coat PVC layer (C) described above. The top paint layer (C') can usually be formed by coating an ultraviolet-curable paint comprising a resin having an unsaturated double bond, a reactive diluent, and a light sensitizer on the undercoat layer (B) and irradiating ultraviolet light onto the coating. The unsaturated resin preferably has at least two unsaturated double bonds. Examples of such unsaturated resin include epoxy acrylate resins obtained from polyepoxy resins such as a bisphenol-type epoxy resin, a phenol novolak-type epoxy resin and a cresol novolak-type epoxy resin and unsaturated acids such as acrylic acid and methacrylic acid; resins such as polyester polyols, polyether polyols, vinyl polymers and copolymers having a hydroxyl group at the side chain; urethane-modified acrylic resins derived from diisocyanate monomers and acrylic or methacrylic esters having one hydroxyl group in the molecule; and unsaturated polyester resins. Usually, those containing at least two unsaturated double bonds are used. To impart flexibility, however, resins having one unsaturated double bonds can be used in combination in an amount of not more than 50% by weight of the resins having at least two unsaturated double bonds.

The reactive diluent used in the ultraviolet-curable paint for the formation of the top paint layer (C') is a liquid compound which dissolves the resin having an unsaturated double bond, and undergoes a curing reaction with the resin upon the excitation of the light sensitizer caused by ultraviolet radiation. Preferably, the reactive diluent is an acrylic compound having a viscosity of not more than 1,000 centipoises. Specific examples include acrylic compounds obtained from acrylic acid or methacrylic acid and aliphatic polyhydric alcohols such as ethylene glycol, butylene glycol, 1,6-hexanediol, propylene glycol, neopentyl glycol, diethylene glycol, triethylene glycol, dipropylene glycol, tripropylene glycol, trimethylolpropane, trimethylolethane and glycerol; butyl carbitol acrylate; $\beta$-hydroxyethyl acrylate; and benzoyloxybutyl acrylate.

The interior finishing material of this invention can be produced, for example, by forming the undercoat layer (B) on the base material (A), and then forming on the undercoat layer (B) the top coat PVC layer (C) or the ultraviolet-cured top paint layer (C'). Specifically, a sol-type undercoat material is coated to a thickness of about 0.2 to 3 mm, and heated at 110° to 150° C. to form a semi-gel. Then, ultraviolet light is partially irradiated on the semi-gel layer, and the layer is further heated at about 200° C. to foam and cure the undercoat material and thereby to form the undercoat layer (B). Alternatively, a foamed and cured undercoat layer (B) prepared separately in a similar manner is bonded to the base material (A) by means of a suitable adhesive. Next, a top layer having a thickness of 0.01 to 1 mm, preferably 0.04 to 0.2 mm, is formed on the undercoat layer (B) at 150° to 230° C. by celendering, extrusion, etc., or coated on it. Then, the top coat material is cured by the irradiation of ultraviolet light to form a top coat layer (C).

Instead of the aforesaid method, the undercoat layer and the top coat layer may be formed simultaneously. Specifically, this can be achieved by a method which comprises coating a sol-type undercoat layer on a base material to a thickness of about 0.2 to 3 mm, half-gelling the coating at 110° to 150° C., partly printing or coating on the semi-gel layer an ink containing an ultraviolet shielding agent, a paint having an effect of shielding ultraviolet light, an ultraviolet-impervious plastic film, a metal foil, paper, a wooden plate, etc., heat-forming coating a top coat material on the product at 150° to 230° C. by calendering, extrusion, etc, or coating it on the product, irradiating ultraviolet light from above the resulting product to cure the undercoat layer partially and the top coat layer entirely, and heating the entire assembly at about 200° C. An especially preferred interior finishing material can be produced by this method.

Light sources which can be used in this invention to generate ultraviolet light include a metal halide lamp, a carbon arc lamp, a mercury vapor lamp, an ultraviolet fluorescent lamp, a tungsten lamp, a glow lamp, a xenon lamp, an argon glow lamp, an illuminating lamp for photography, and sunlight.

Examples of the ultraviolet shielding agent included in the aforesaid ink are known and comprise salicylic acid, benzophenone, benzotriazole and phenol compounds, such as p-t-butylphenyl salicylate, 2-hydroxy-4-benzyloxybenzophenone, 2-(hydroxy-5-t-butylphenyl)-benzotriazole, 2,2'-dihydroxy-4-methoxybenzophenone, and 2-hydroxy-4-benzyloxybenzophenone.

Since the material for forming the top PVC layer (C) undergoes heat-molding treatments such as calendering and extrusion, it is preferred to add polymerization inhibitors. The amount of the polymerization inhibitor has to do with the amount of the reactive plasticizer, and is usually not more than 5% by weight, preferably not more than 2% by weight, based on the reactive plasticizer.

In the interior finishing material of this invention, a layer having a high thermal conductivity may be interposed between the base material (A) and the undercoat layer (B). Examples of the layer having a high thermal conductivity are foils, foil pieces, foil strips or powders of metals such as aluminum, copper, iron, silver, magnesium or zinc; films of thermoplastic synthetic resins at least one surface of which has a layer of any of the above metal formed by plating or vacuum deposition, and resin films containing the metal foil pieces.

The accompanying drawings show various embodiments of the interior finishing material of this invention.

FIG. 1 is a sectional view of an interior finishing material composed of a base material 1, a foamed and cured undercoat layer 2 obtained from PVC, a reactive plasticizer, a blowing agent and a light sensitizer formed on the base material 1, and a cured PVC top layer 3 obtained from PVC, a reactive plasticizer and a light sensitizer or an ultraviolet-cured paint layer 3 formed on top of the undercoat layer 2.

Figure 2:
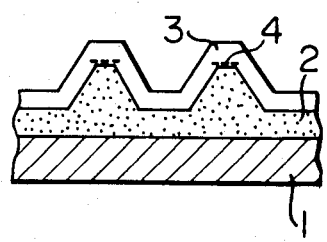

FIG. 2 is a sectional view of an interior finishing material which has the same structure as the material shown in FIG. 1 except that it further includes a partially printed or coated layer 4 derived from an ink containing an ultraviolet-shielding agent, a paint having an effect of shielding ultraviolet light, an ultraviolet-impervious plastic film, a metal foil, paper, a wooden plate or a cloth between the undercoat layer 2 and the top coat layer 3.

Figure 3:
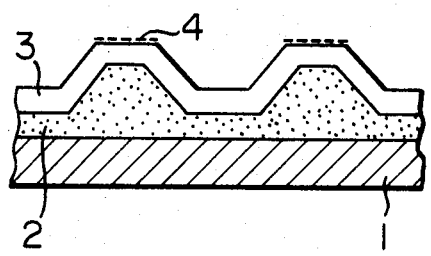

FIG. 3 is a sectional view of an interior finishing material which has the same structure as the material shown in FIG. 1 except that it further includes a partially printed layer or coated layer 4 derived from an ink containing an ultraviolet-shielding agent, paint, plastic film, metal foil, or paper on the top coat layer 3.

Figure 4:
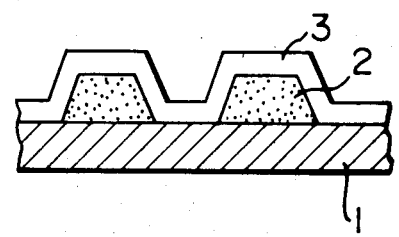

FIG. 4 is a sectional view of an interior finishing material in which the undercoat layer 2 is partly coated on the base material 1, and the top coat layer 3 is coated on the undercoat layer 2.

Figure 5:
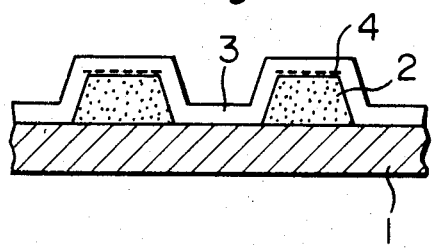

FIG. 5 is a sectional view of an interior finishing material which has the same structure as the material shown in FIG. 4 except that it further includes the same partially printed or coated layer 4 as in FIG. 2 between the undercoat layer 2 and the top coat layer 3.

Figure 6:
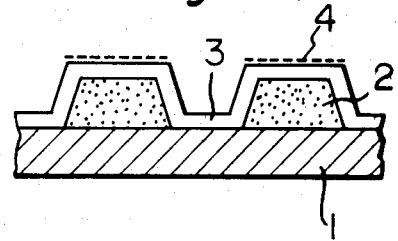

FIG. 6 is a sectional view of an interior finishing material which has the same structure as the material shown in FIG. 4 except that it further includes the same partially printed or coated layer 4 as in FIG. 3 on the top coat layer 3.

Figure 7:
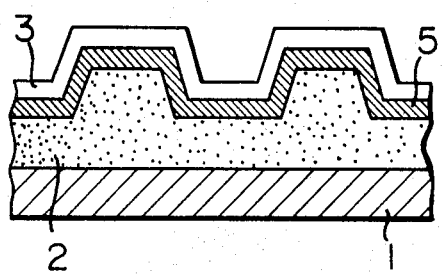

FIG. 7 is a sectional view of an interior finishing material consisting of a base material 1, an undercoat layer 2 formed thereon, an intermediate thermoplastic resin layer 5 not containing a reactive plasticizer and a light sensitizer formed on top of the layer 2, and a top coat layer 3.

Figure 8:
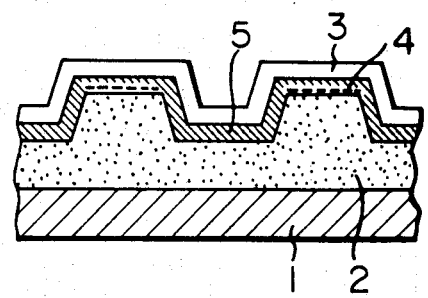

FIG. 8 is a sectional view of an interior finishing material which has the same structure as the material shown in FIG. 7 except that it further includes the same partially printed or coated layer 4 between the undercoat layer 2 and the thermoplastic resin layer 5.

The interlayer 5 of thermoplastic resin in the embodiments shown in FIGS. 7 and 8 may be any of thermoplastic resin layers which do not impair the result intended by this invention. Specific examples of the thermoplastic resins used in the intermediate layer 5 are PVC sol, ethylene-vinyl acetate copolymer, natural rubber, synthetic rubber, and polyurethane. The PVC sol is preferred, however.

The interior finishing material of this invention has an embossed pattern with superior surface hardness, transparency, abrasion resistance and cigarette mark resistance, and can be used advantageously as floor materials, wall materials, leather-like materials, etc.

The following Examples and Comparative Examples illustrate the present invention. It should be understood that the invention is not limited to these Examples alone. All parts in these examples are by weight.

EXAMPLE 1

| | |
|---|---|
| PVC (Geon 121; a product of Nippon Zeon Co., Ltd.) | 100 parts |
| Dioctyl phthalate | 30 parts |
| Dibutyl phthalate | 25 parts |
| Trimethylolpropane trimethacrylate (reactive plasticizer) | 10 parts |
| Azodicarbonamide (blowing agent) | 2 parts |
| STANCLERE-M-7205 (a trademark for a Ba/Zn stabilizer made by Japan Interstab Ltd.) | 2 parts |
| Benzoin monomethyl ether (light sensitizer) | 0.2 parts |

The above ingredients were kneaded in a grinding machine for 20 minutes to form a PVC sol. The sol was coated to a thickness of 1 mm on an asbestos sheet as a base material, and heated at 120° C. for 1 minute to form a half-gelled undercoat layer. Then, an ink composition of the following formulation was partially coated on the undercoat layer.

| Formulation of the ink composition | |
| --- | --- |
| Vinyl chloride-vinyl acetate copolymer | 10 parts |
| Methyl ethyl ketone | 90 parts |
| 2-(3',5'-di-t-butyl-2'-hydroxyphenyl)benzotriazole (ultraviolet shielding agent) | 5 parts |
| Pigment | 5 parts |

A PVC compound of the following formulation was kneaded at 170° C. for 10 minutes by using a calendar equipped with two rolls to form a sheet having a thickness of 0.3 mm.

| Formulation of the PVC compound | |
| --- | --- |
| PVC (Geon 103EP, a product of Nippon Zeon Co., Ltd.) | 100 parts |
| Trimethylolpropane trimethacrylate | 30 parts |
| Benzoin isopropyl ether | 0.45 parts |
| Hydroquinone | 0.05 parts |
| Dimethyltin-bis(isooctyl thioglycolate) | 1.5 parts |

The resulting sheet as a top coat layer was superimposed on the partially ink-coated undercoat layer, and melt-adhered at 140° C.

The resulting laminate was exposed twice to the irradiation of a metal halide lamp (two 120 W/cm ultraviolet lamps made by Iwasaki Electrical Co., Ltd.; distance from the light source 15 cm; the belt speed 5 m/min.). Then, the laminate was heated at 210° C. for 3 minutes to form an interior finishing material having an embossed pattern which is of the type shown in FIG. 2. The depth of the emboss was 1.3 mm.

When this interior finishing material was subjected to the following cigarette mark resistance test, its surface turned brown. But no depression was caused to the coated layer, nor the cigarette ash adhered to it.

Test for cigarette mark resistance

A lit cigarette (brand "SEVEN STAR", a product of Japan Monopoly Corporation) which burned through at least 20 mm from its tip but in which the fire did not extend to more than 30 mm from the other end), after striking off the ash well, was placed on the top surface of the sample interior finishing material, and immediately then, crushed out by a shoe sole. The surface condition of the sample, the degree of breakage of the sample and the manner of ash adhesion to the sample were examined.

EXAMPLE 2

In the procedure of Example 1, the top layer was melt-adhered to the undercoat layer by calendering at 140° C. without interposing the ink composition between them. The surface of the laminate was partially covered with an aluminum foil, and the entire assembly was exposed to ultraviolet irradiation and foamed under the same conditions as in Example 1. Then, the aluminum foil was removed, and the assembly was exposed to ultraviolet radiation under the same conditions as in Example 1 to afford an interior finishing material having an embossed pattern which is of the type shown in FIG. 1. The depth of the emboss was 1.4 mm. The resulting interior finishing material was subjected to the same test as in Example 1, and found to have good cigarette mark resistance.

EXAMPLE 3

A half-gelled undercoat layer was coated on a base material in the same way as in Example 1, and the same ink composition as in Example 1 was partly coated on the half-gelled undercoat layer. Separately, a 0.2 mm sheet was prepared by calendering from a PVC compound of the following formulation not containing a reactive plasticizer. The sheet was superimposed on the partly ink-coated undercoat layer, and melt-adhered at 140° C. Then, an ultraviolet-curable paint having the formlation shown below was coated on the PVC sheet layer to a thickness of 0.1 mm. The assembly was exposed to ultraviolet radiation, and foamed under the same conditions as in Example 1 to afford an interior finishing material having an embossed pattern which is of the type shown in FIG. 3. The depth of the emboss was 1.2 mm.

The resulting interior finishing material was subjected to the same test as in Example 1, and was found to have good cigarette mark resistance.

| Formulation of the PVC compound | |
| --- | --- |
| PVC (Geon 103EP, a product of Nippon Zeon Co., Ltd) | 100 parts |
| Dioctyl phthalate | 30 parts |
| Dimethyltin bis(isooctyl thioglycolate) | 2 parts |
| Formulation of the ultraviolet-curable paint | |
| Urethane-modified acrylic resin | 60 parts |
| Trimethylolpropane triacrylate | 20 parts |
| Benzoyloxybutyl acrylate | 20 parts |
| Benzoin monomethyl ether | 2 parts |

COMPARATIVE EXAMPLE 1

A sheet having an embossed pattern was produced by the same procedure as in Example 3 except that the ultraviolet-curable paint was not coated. The depth of the emboss in the resulting sheet was 1.5 mm. When the resulting sheet was subjected to the cigarette mark resistance test shown in Example 1, the surface of the sheet was heavily deformed. The tabacco ash adhered markedly to the surface.

COMPARATIVE EXAMPLE 2

A sheet having an embossed pattern was produced by the same procedure as in Example 1 except that the top coat layer was not provided. The depth of the emboss was 2.0 mm. It was found by the same test as in Example 1 that the resulting sheet had poor cigarette mark resistance as in Comparative Example 1.

EXAMPLE 4

Example 1 was repeated except that the top coat layer was formed of a composition having the formulation shown below. The resulting interior finishing material had the same emboss depth and cigarette mark resistance as the material produced in Example 1. In addition, it had superior resistance to heat coloration (resistance to yellowing) because of the use of a reactive plasticizer having an aromatic ring in the formation of the top coat layer.

| Formulation of the top coat layer | |
|---|---|
| PVC | 100 parts |
| Trimethylolpropane trimethacrylate | 15 parts |
| 2,2-bis(4-acryloxy-diethoxyphenyl)propane | 15 parts |
| Benzoyl isopropyl ether | 0.45 parts |
| Hydroquinone | 0.05 parts |
| Dimethyltin bis(isooctyl thioglycolate) | 1.5 parts |

EXAMPLE 5

Example 1 was repeated except that a composition having the formulation shown below was used to provide the top coat layer. The resulting interior finishing material had better flexibility than the material obtained in Example 1 because the top layer contained dioctyl phthalate. The depth of the emboss was 1.7 mm.

| Formulation of the top coat layer | |
|---|---|
| PVC | 100 parts |
| Trimethylolpropane trimethacrylate | 30 parts |
| Dioctyl phthalate | 30 parts |
| Benzoin isopropyl ether | 0.45 parts |
| Hydroquinone | 0.05 parts |
| Dimethyltin bis(isooctyl thioglycolate) | 1.5 parts |

What we claim is:

1. A method for producing an embossed interior finishing material having superior cigarette mark resistance, which comprises coating a composition comprising a vinyl chloride polymer, a reactive plasticizer, a blowing agent and a light sensitizer on a base material (A), irradiating ultraviolet light partly onto the coated base material, heating the coated base material to form a foamed undercoat layer (B), coating a composition comprising a vinyl chloride polymer, a reactive plasticizer and a light sensitizing agent on said undercoat layer (B), and then irradiating ultraviolet light onto the resulting laminate to form a top coat layer (C).

2. The method of claim 1 wherein said base material (A) is selected from the group consisting of an asbestos sheet, a glass fiber-incorporated polyvinyl chloride sheet, a polyvinyl chloride sheet, a foamed polyvinyl chloride sheet, a flax felt, a cotton cloth, a nonwoven cloth, paper, a plywood, a particle board, a slate plate and a steel plate.

3. The method of claim 1 wherein said reactive plasticizer is a compound which has at least two polymerizable unsaturated bonds, and plasticizes the vinyl chloride polymer.

4. The method of claim 1 wherein said light sensitizer is a compound which is excited by ultraviolet radiation to induce a reaction of the reactive plasticizer.

5. The method of claim 1 wherein said undercoat layer (B) is partially foamed.

6. The method of claim 1 wherein the partial irradiation of ultraviolet light for the formation of the undercoat layer (B) is carried out by irradiating ultraviolet light through an ink containing an ultraviolet shielding ink, a paint having an effect of shielding ultraviolet light, an ultraviolet-impervious plastic film, a metal foil, paper, a wooden plate or a cloth printed or coated partly on the surface of the undercoat layer.

7. A method for producing an embossed interior finishing material having superior cigarette mark resistance, which comprises coating a sol for the formation of an undercoat layer (B) comprising a vinyl chloride polymer, a reactive plasticizer, a blowing agent and a light sensitizer on a base material (A), heating the coating to convert the coating to a semi-gel, partly printing or coating an ink containing an ultraviolet-shielding agent, a paint having an effect of shielding ultraviolet light, an ultraviolet-impervious plastic film, a metal foil, paper, a wooden plate or a cloth on the semi-gel layer, then coating a transparent sheet for the formation of a top coat layer (C) obtained from a vinyl chloride polymer, a reactive plasticizer and a light sensitizer on the printed or coated layer, irradiating ultraviolet light onto the resulting laminate, and heating the laminate to provide a foam.

8. The method of claim 1 or 7 wherein the sol for the formation of the undercoat layer (B) is coated to a thickness of 0.2 to 3 mm on the base material (A).

9. A floor material composed of the interior finishing material obtained by the method of claim 1 or 7.

10. A wall material composed of the interior finishing coating material obtained by the method of claim 1 or 7.

11. A leather-like material composed of the interior finishing material obtained by the method of claim 1 or 7.

12. A decorative laminate composed of the interior finishing material obtained by the method of claim 1 or 7.

13. A polyvinyl chloride-coated steel sheet composed of the interior finishing material obtained by the method of claim 1 or 7.

* * * * *